United States Patent
Hsieh et al.

(10) Patent No.: US 10,843,407 B2
(45) Date of Patent: Nov. 24, 2020

(54) THREE-DIMENSIONAL PRINTING SYSTEM

(71) Applicants: XYZprinting, Inc., New Taipei (TW); Kinpo Electronics, Inc., New Taipei (TW)

(72) Inventors: Chi-Wen Hsieh, New Taipei (TW); Chung-Hsuan Wu, New Taipei (TW); Yang-Teh Lee, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 127 days.

(21) Appl. No.: 15/989,210

(22) Filed: May 25, 2018

(65) Prior Publication Data

US 2019/0248071 A1 Aug. 15, 2019

(30) Foreign Application Priority Data

Feb. 12, 2018 (CN) .......................... 2018 1 0143805

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/118* (2017.08); *B29C 64/227* (2017.08);
(Continued)

(58) Field of Classification Search
CPC .... B29C 64/209; B29C 64/118; B29C 64/295
See application file for complete search history.

(56) References Cited

U.S. PATENT DOCUMENTS 9,126,365 B1 * 9/2015 Mark ..................... B29C 70/20
2015/0130101 A1 5/2015 Fiegener
(Continued)

FOREIGN PATENT DOCUMENTS

CN 108177335 6/2018
CN 207954654 10/2018
(Continued)

OTHER PUBLICATIONS

"Office Action of Japan Counterpart Application," dated Nov. 12, 2019, p. 1-p. 5.

*Primary Examiner* — Jacob T Minskey
*Assistant Examiner* — Adrien J Bernard
(74) *Attorney, Agent, or Firm* — JCIPRNET

(57) ABSTRACT

A three-dimensional (3D) printing system including a control module, at least one moving module, a particle-type 3D printing nozzle and a coil-type 3D printing nozzle is provided. The moving module, the particle-type 3D printing nozzle and the coil-type 3D printing nozzle are respectively and electrically connected to the control module, and the particle-type 3D printing nozzle and the coil-type 3D printing nozzle are disposed on the at least one moving module. The control module moves the particle-type 3D printing nozzle or the coil-type 3D printing nozzle through the at least one moving module, and drives the particle-type 3D printing nozzle or the coil-type 3D printing nozzle to perform a 3D printing operation to print a 3D object.

8 Claims, 6 Drawing Sheets

(51) Int. Cl.
*B29C 64/118* (2017.01)
*B33Y 50/02* (2015.01)
*B29C 64/295* (2017.01)
*B29C 64/393* (2017.01)
*B29C 64/227* (2017.01)

(52) U.S. Cl.
CPC .......... *B29C 64/295* (2017.08); *B29C 64/393* (2017.08); *B33Y 30/00* (2014.12); *B33Y 50/02* (2014.12)

(56) References Cited

U.S. PATENT DOCUMENTS

| | | | |
|---|---|---|---|
| 2015/0174824 A1* | 6/2015 | Gifford | B29C 64/20 |
| | | | 425/183 |
| 2015/0201500 A1* | 7/2015 | Shinar | H05K 3/125 |
| | | | 425/132 |
| 2016/0031159 A1 | 2/2016 | Church et al. | |
| 2017/0217088 A1* | 8/2017 | Boyd, IV | B29C 64/106 |
| 2017/0252851 A1 | 9/2017 | Fulop et al. | |

FOREIGN PATENT DOCUMENTS

| | | |
|---|---|---|
| DE | 102016108351 | 11/2016 |
| JP | 2016088002 | 5/2016 |
| JP | 2016088003 | 5/2016 |
| JP | 2016088004 | 5/2016 |

\* cited by examiner

THREE-DIMENSIONAL PRINTING SYSTEM

CROSS-REFERENCE TO RELATED APPLICATION

This application claims the priority benefit of China application serial no. 201810143805.X, filed on Feb. 12, 2018. The entirety of the above-mentioned patent application is hereby incorporated by reference herein and made a part of this specification.

BACKGROUND

Technical Field

The disclosure relates to a three-dimensional (3D) printing system.

Description of Related Art

Along with progress of Computer-Aided Manufacturing (CAM), the manufacturing industry has developed a Rapid Prototyping (RP) technique capable of quickly producing an original design prototype. The RP technique has no limitation in geometric shape, and the more complex a printed part is, the more superior the technique demonstrates, and the RP technique may greatly save manpower and processing time, and in terms of a requirement of the shortest time, a design part on 3D CAD is truly presented, which is not only touchable, but its geometric curve may be truly felt, and assemblability of the part may be tested, and possible functional test may be carried out.

There are many kinds of these rapid prototyping methods, for example, Fused Deposition modelling, (FDM), Laminated Object Manufacturing (LOM), etc. However, a 3D printing device using the aforementioned rapid prototyping methods to print a 3D object only has one printing heat, so that a forming material has to be subjected to processes of heating, driving, squeezing, etc. in the printing nozzle before being squeezed out and printed on a printing platform in a melted state. Therefore, a fabrication time of the 3D object is limited by the aforementioned processes, and it is not easy to improve printing efficiency.

Moreover, regarding a coil-type 3D printing device, the forming material thereof is a wire rod with a fixed outer diameter, so that when a mass printing task is to be carried out (for example, to print a 3D object of a large volume), a longer producing time is spent. Meanwhile, the wire rod is also limited by its material characteristic, and not all of the materials may be successfully transformed into the wire rod with the outer diameter satisfying the 3D printing requirement.

Based on the above description, how to provide improvement measures to resolve the above problem is an issue to be considered by related technicians of the field.

SUMMARY

The disclosure is directed to a three-dimensional (3D) printing system having a particle-type 3D printing nozzle and a coil-type 3D printing nozzle.

According to an embodiment of the disclosure, a 3D printing system includes a control module, at least one moving module, a particle-type 3D printing nozzle and a coil-type 3D printing nozzle. The moving module, the particle-type 3D printing nozzle and the coil-type 3D printing nozzle are respectively and electrically connected to the control module, and the particle-type 3D printing nozzle and the coil-type 3D printing nozzle are disposed on the moving module. The control module moves the particle-type 3D printing nozzle or the coil-type 3D printing nozzle through the moving module, and drives the particle-type 3D printing nozzle or the coil-type 3D printing nozzle to perform a 3D printing operation to print a 3D object.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
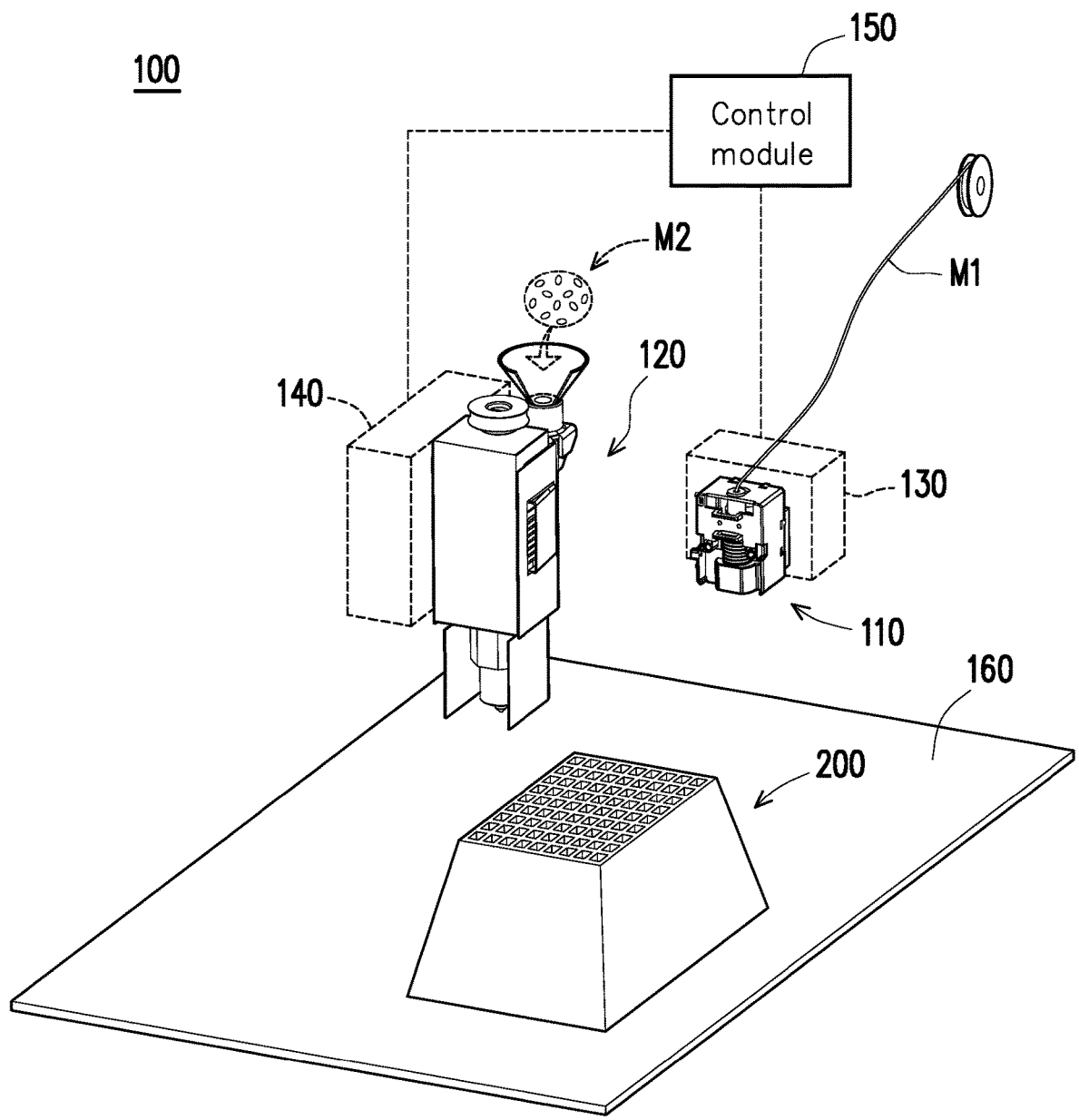
FIG. 1 is a schematic diagram of a 3D printing system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
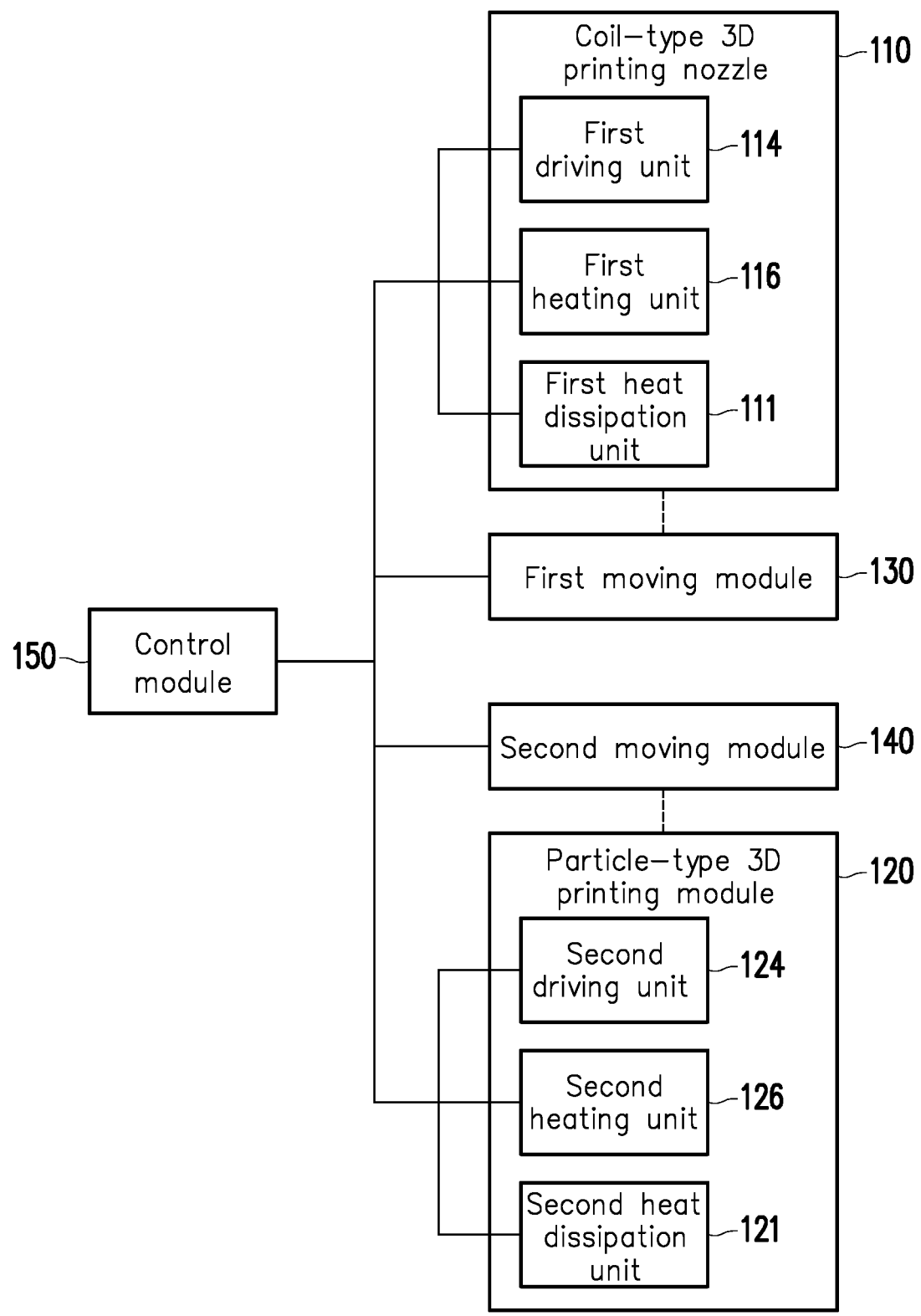
FIG. 2 is a schematic diagram of an electrical connection of the 3D printing system of FIG. 1.

FIG. 1 is a schematic diagram of a 3D printing system according to an embodiment of the disclosure. FIG. 2 is a schematic diagram of an electrical connection of the 3D printing system of FIG. 1. Referring to FIG. 1 and FIG. 2, in the present embodiment, the 3D printing system 100 includes a coil-type (filament type) 3D printing nozzle 110, a particle-type (pellet type) 3D printing nozzle 120, a first moving module 130, a second moving module 140, a control module 150 and a platform 160, where the coil-type 3D printing nozzle 110 is disposed on the first moving module 130, and the coil-type 3D printing nozzle 110 and the first moving module 130 are respectively and electrically connected to the control module 150, and the particle-type 3D printing nozzle 120 is disposed on the second moving module 140, and the particle-type 3D printing nozzle 120 and the second moving module 140 are respectively and electrically connected to the control module 150. The first moving module 130 and the second moving module 140 are, for example, respectively a three-axis (X-Y-Z) moving module, and are respectively used for driving the coil-type 3D printing nozzle 110 and the particle-type 3D printing nozzle 120 to move above the platform 160, so that the control module 150 may further drive the coil-type 3D printing nozzle 110 and the particle-type 3D printing nozzle 120 to print a 3D object 200 above the platform 160.

Figure 3A:
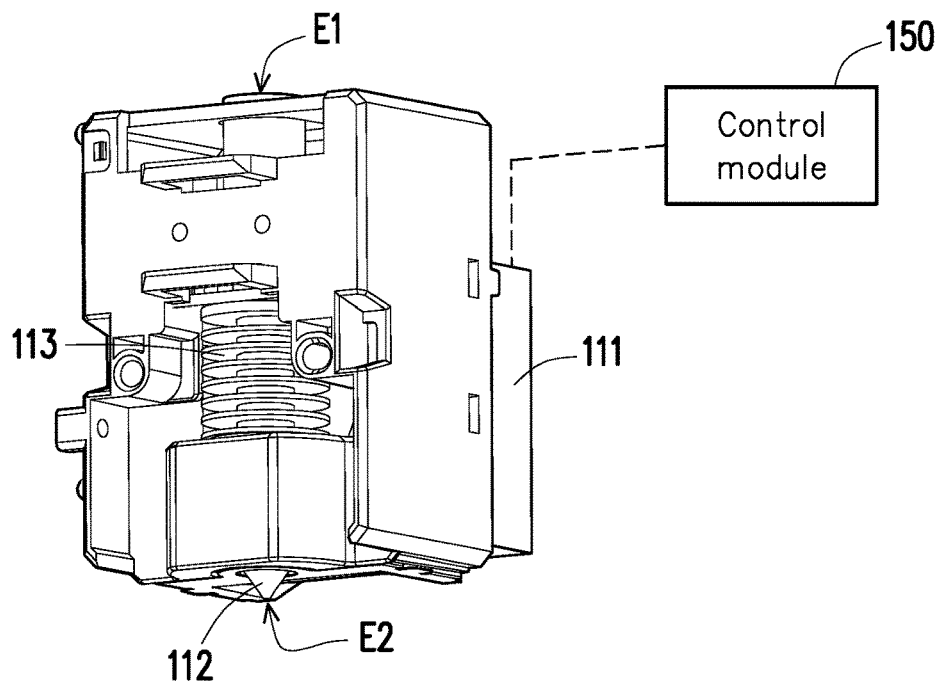
FIG. 3A is a schematic diagram of a coil-type 3D printing nozzle.
Figure 3B:
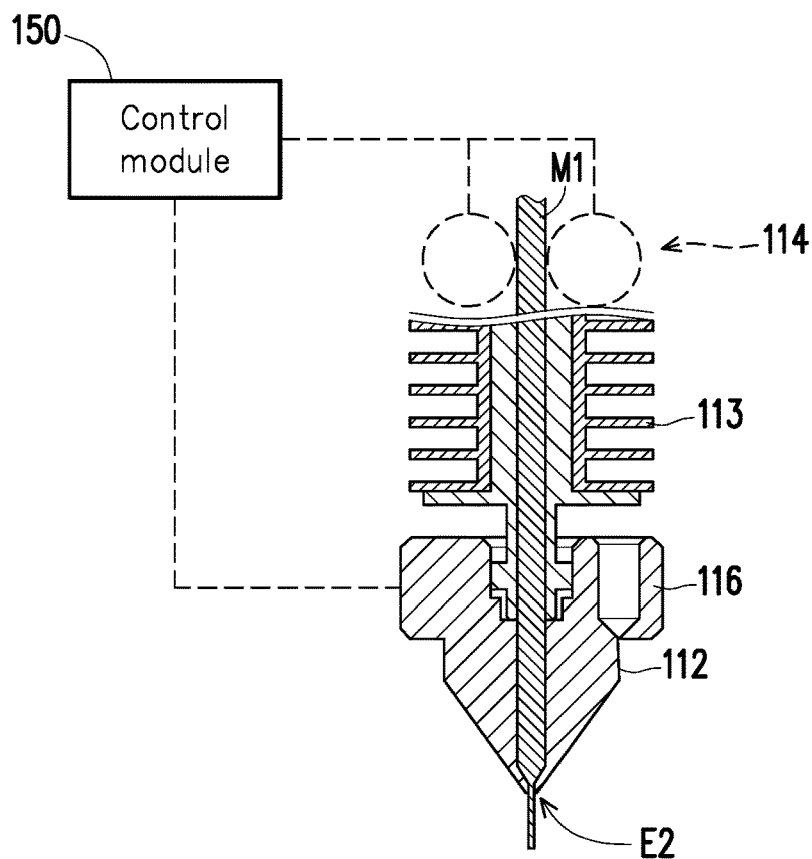
FIG. 3B is a partial cross-sectional view of FIG. 3A.

FIG. 3A is a schematic diagram of a coil-type 3D printing nozzle. FIG. 3B is a partial cross-sectional view of FIG. 3A. Referring to FIG. 1 to FIG. 3B, in the present embodiment, the coil-type 3D printing nozzle 110 includes a first nozzle unit 112, a first driving unit 114 and a first heating unit 116, where the first driving unit 114 is disposed on the first nozzle unit 112, and the first driving unit 114 is electrically connected to the control module 150. The first heating unit 116 is disposed on the first nozzle unit 112, and the first heating unit 116 is electrically connected to the control module 150. The first nozzle unit 112 has a first feed-in region E1 and a first feed-out region E2. Based on the above description, a wire-shape forming material (filament) M1 is adapted to enter the first nozzle unit 112 through the first feed-in region E1, and is driven by the first driving unit 114, which, for example, includes a pair of rollers and a motor (not shown) used for driving the rollers to move in the first nozzle unit 112. Meanwhile, the first heating unit 116 is adapted to heat the wire-shape forming material M1 in the first nozzle unit 112, such that the wire-shape forming material M1 is transformed into a melted state, and is pushed by the first driving unit 114 and squeezed out of the first nozzle unit 112 through the first feed-out region E2. Moreover, the coil-type 3D printing nozzle 110 further includes a first heat dissipation unit 111, for example, a fan, which is disposed on the first nozzle unit 112, and is electrically connected to the control module 150, so that the heat dissipation unit 111 may be controlled by the control module 150 to dissipate heat of at least a part of the first nozzle unit 112. Moreover, the first nozzle unit 112 of the present embodiment is further configured with fins 113, where the fins 113 faces the first heat dissipation unit 111 correspondingly, such that the heat of the first nozzle unit 112 that is generated by the first heating unit 116 may be conducted to the fins 113, and is quickly cool by a cooling airflow provided by the fan, so as to avoid overheat of the first nozzle unit 112 to cause advance melting of the wire-shape forming material M1 that is still in a solid state or avoid carbonization of the melted wire-shape forming material M1 due to the overheat.

As shown in FIG. 1, the wire-shape forming material M1 is adapted to be disposed on a winding roll, and is connected to the first feed-in region E1 of the coil-type 3D printing nozzle 110 (shown in FIG. 3A). It should be noted that a single wire is taken as an example for description, though the disclosure is not limited thereto. Namely, in other embodiment that is not shown, the 3D printing system may be configured with a plurality of winding rolls or a plurality of coil-type 3D printing nozzles, so as to achieve effects of providing different materials and different colors during a printing process.

Figure 4A:
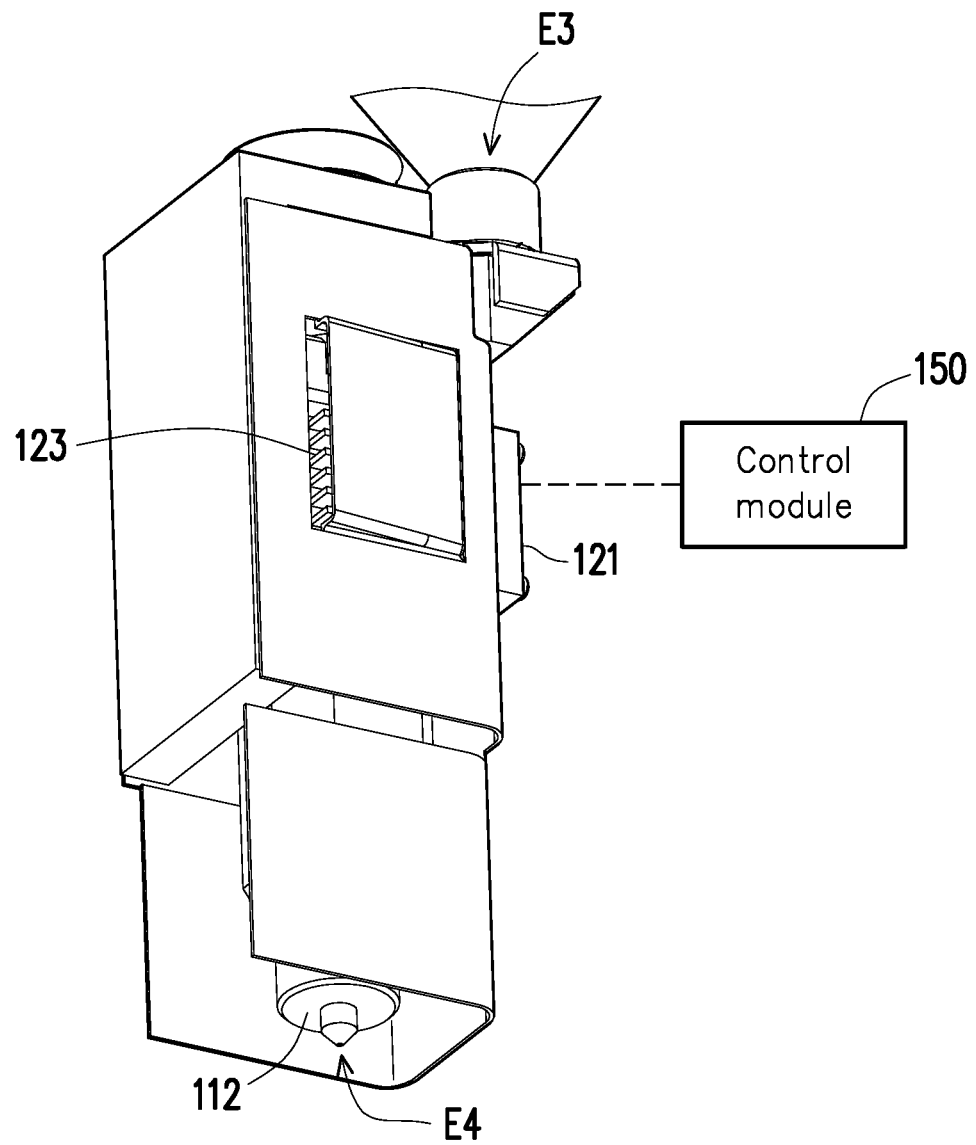
FIG. 4A is a schematic diagram of a particle-type 3D printing nozzle.
Figure 4B:
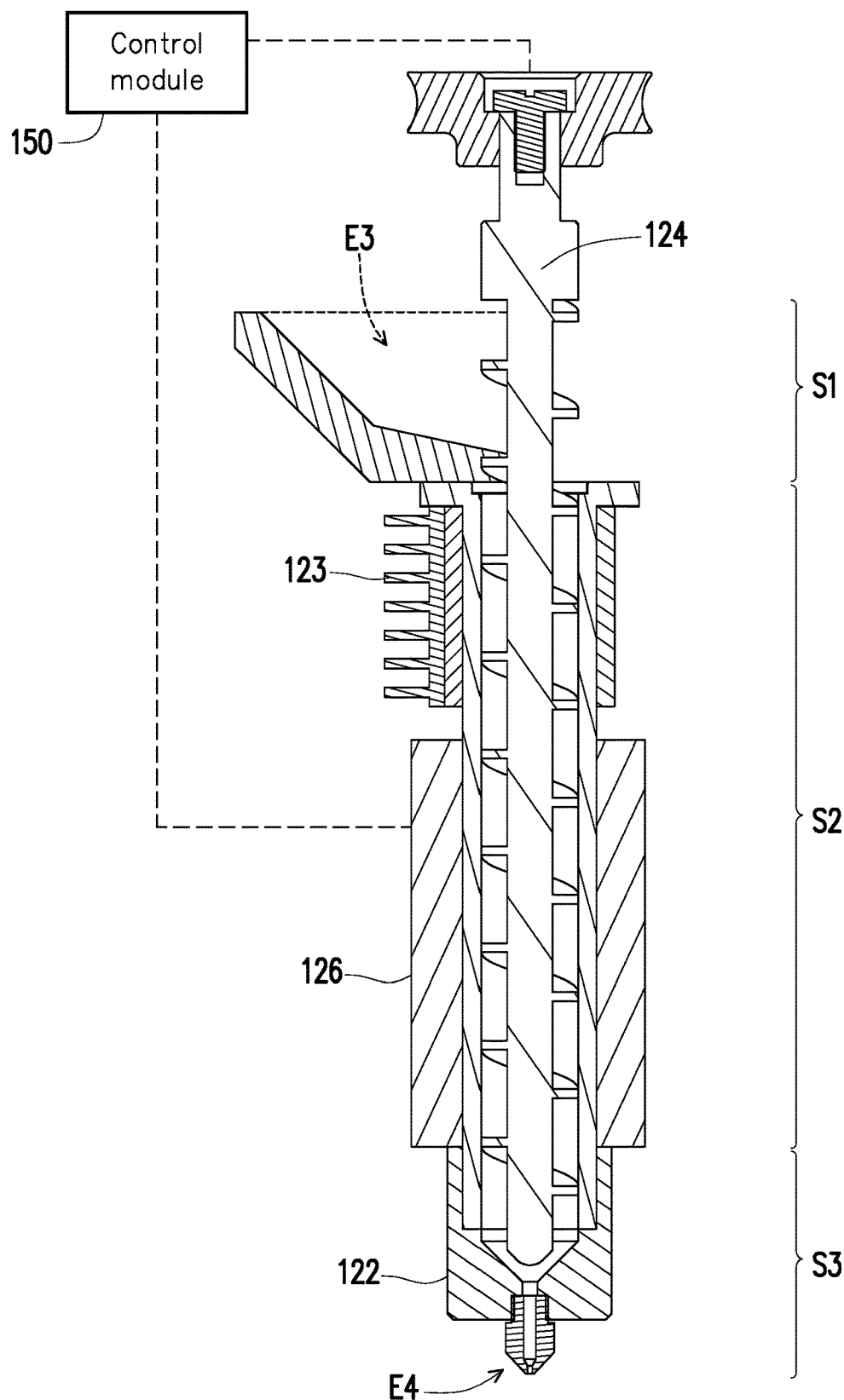
FIG. 4B is a partial cross-sectional view of FIG. 4A.

FIG. 4A is a schematic diagram of a particle-type 3D printing nozzle. FIG. 4B is a partial cross-sectional view of FIG. 4A. Referring to FIG. 1, FIG. 2, FIG. 4A and FIG. 4B, in the present embodiment, the particle-type 3D printing nozzle 120 includes a second nozzle unit 122, a second driving unit 124 and a second heating unit 126, where the second driving unit 124 and the second heating unit 126 are respectively disposed on the second nozzle unit 122, and the second driving unit 124 and the second heating unit 126 are respectively and electrically connected to the control module 150. The second nozzle unit 122 has a second feed-in region E3 and a second feed-out region E4. As shown in FIG. 1, the particle forming material (pellet) M2 is adapted to enter the second nozzle unit 122 through the second feed-in region E3 (shown in FIG. 4A and FIG. 4B). It should be noted that the second driving unit 124 is, for example, a screw stem and a motor used for driving the screw stem, and is used for driving the particle forming material M2 that enters the second nozzle unit 122 through the second feed-in region E3 to move to the second feed-out region E4. During the moving process, the second heating unit 126 may heat the passing-by particle forming material M2, such that the particle forming material M2 presents a melted state, and is driven by the second driving unit 124 and squeezed out of the second nozzle unit 122 through the second feed-out region E4.

Further, the second driving unit 124 is movably disposed in the second nozzle unit 122 and has a first section S1, a second section S2 and a third section S3, where the first section S1 is located at the second feed-in region E3, and the third section S3 is located at the second feed-out region E4. The second heating unit 126 corresponds to the second section S2 of the screw stem, and the second section S2 is connected between the first section S1 and the third section S3.

Moreover, the particle-type 3D printing nozzle 120 further includes a second heat dissipation unit 121, for example, a fan, which is disposed on the second nozzle unit 122 and electrically connected to the control module 150, and the heat dissipation unit 121 is adapted to dissipate heat of at least a part of the second nozzle unit 112. Meanwhile, the particle-type 3D printing nozzle 120 further includes fins 123, where the fins 123 are disposed on the second nozzle unit 122 and located between the second heating unit 126 and the second feed-in region E3, and the fins 123 right faces the second heat dissipation unit 121, such that the heat of the second nozzle unit 122 that is generated by the second heating unit 126 may be conducted to the fins 123, and is quickly cool by a cooling airflow provided by the fan, so as to avoid overheat of the second nozzle unit 122 to cause advance melting of the particle forming material M2 that is still in the solid state or avoid carbonization of the melted particle forming material M2 due to the overheat.

It should be noted that in the present embodiment, although the single particle-type 3D printing nozzle 120 is used, the disclosure is not limited thereto. Similar to the aforementioned coil-type 3D printing nozzle 110, the 3D printing system may be configured with a plurality of particle-type 3D printing nozzles, so as to achieve the effects of providing different materials and different colors during the printing process.

Since the 3D printing measures respectively adopted by the coil-type 3D printing nozzle 110 and the particle-type 3D printing nozzle 120 are different, the 3D printing system 100 may simultaneously control the different nozzles to achieve a required effect.

For example, regarding the coil-type 3D printing nozzle 110, since the forming material thereof is the rod-shape forming material M1, a required driving power is smaller than that of the particle-type 3D printing nozzle 120. Namely, the driving power (for example, an electric power or a power of a power source) required by the first driving unit 114 (for example, rollers) is smaller than that of the second driving unit 124 (for example, the screw stem), and the first driving unit 114 is more sensitive and more easily controlled. Namely, under the premise of a same feed-out quantity of the forming materials, a control precision of the first driving unit 114 is higher than that of the second driving unit 124, i.e. a control precision of the coil-type 3D printing nozzle 110 is higher than that of the particle-type 3D printing nozzle 120.

On the other hand, although the second driving unit 124 has a slower response and the control precision thereof is lower, since the forming material thereof is the particle forming material M2, it is not limited by a shape of a raw material. Namely, the feed-out quantity of the coil-type 3D printing nozzle 110 is limited by an outer diameter of its wire-shape forming material M1, so that the feed-out quantity of the particle-type 3D printing nozzle 120 that is not limited by the shape of the raw material is greater than the feed-out quantity of the coil-type 3D printing nozzle 110. As described above, not all of the raw materials may be transformed into the wire-shape forming material M1 of the required outer diameter, an in this case, by using the particle forming material M2 instead, a selection range of the raw materials is expanded.

Based on the above description, the 3D printing system 100 of the present embodiment may adopt an optimized means to print the 3D object 200 in the most efficient way by using the coil-type 3D printing nozzle 110 and the particle-type 3D printing nozzle 120.

Figure 5:
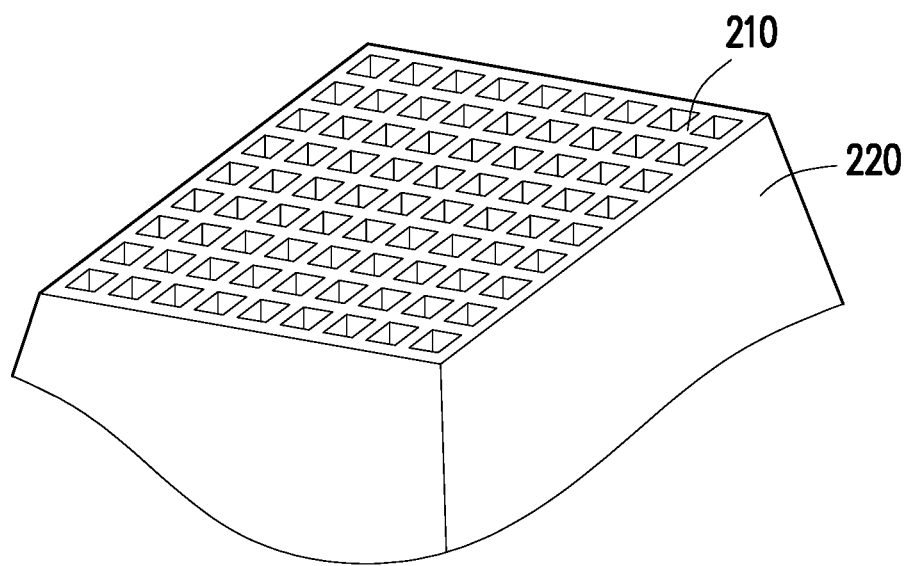
FIG. 5 is a partial schematic diagram of the 3D object of FIG. 1.

For example, FIG. 5 is a partial schematic diagram of the 3D object of FIG. 1. The 3D object 200 includes an internal structure 210 and an outer surface structure 220, which respectively belong to an inner profile and an outer profile of the 3D object 200. Generally, the internal structure 210 serves as a main structure of the 3D object 200, and a purpose thereof is to make the 3D object 200 to have sufficient structural strength, so as to be supported and stand on the platform 160. Comparatively, the outer surface structure 220 may serve as an appearance of the 3D object 200, which provides an aesthetic effect of the 3D object 200, so that it is required to be controlled by fine means. Therefore, during the printing process of the 3D printing system 100 of the present embodiment, it is determined to drive the coil-type 3D printing nozzle 110 or the particle-type 3D printing nozzle 120 to perform the 3D printing operation according to the internal and outer profiles of the 3D object 200 or fineness of a sliced layer. The 3D printing system 100 of the present embodiment is adapted to drive the particle-type 3D printing nozzle 120 to print the internal structure 210 of the 3D object, and adapted to drive the coil-type 3D printing nozzle 110 to print the outer surface structure 220 of the 3D object 200, and a main reason thereof is that the feed-out quantity of the particle-type 3D printing nozzle 120 is large, and the internal structure 210 is unnecessary to consider the aesthetic effect, but the outer surface structure 220 is required to be fabricated by the coil-type 3D printing nozzle 110 with higher control precision, so as to achieve the required aesthetic effect. It should be noted that a driving sequence of the coil-type 3D printing nozzle 110 and the particle-type 3D printing nozzle 120 is not limited by the disclosure.

Figure 6:
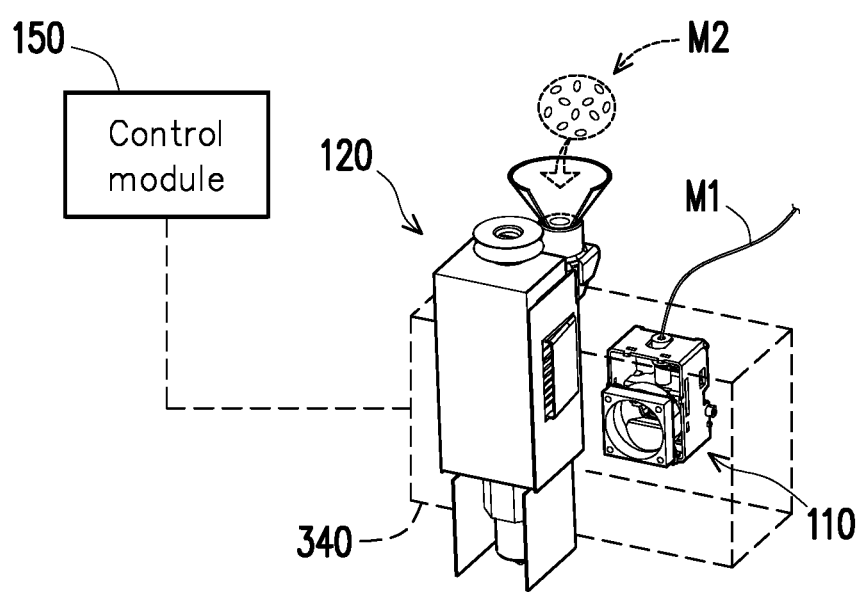
FIG. 6 is a schematic diagram of a 3D printing system according to another embodiment of the disclosure.

FIG. 6 is a schematic diagram of a 3D printing system according to another embodiment of the disclosure. Referring to FIG. 6 and FIG. 1, different to the embodiment of FIG. 1, the 3D printing system of the present embodiment has a single moving module 340, and the coil-type 3D printing nozzle 110 and the particle-type 3D printing nozzle 120 are all disposed on the moving module 340 and located at different sides of the moving module 340. The moving module 340 is electrically connected to the control module 150, and the control module 150 may drive the moving module 340 to simultaneously move the different printing nozzles, and the coil-type 3D printing nozzle 110 and the particle-type 3D printing nozzle 120 are respectively and electrically connected to the control module 150. Other features may refer to related description of the aforementioned embodiment, and detail thereof is not repeated. In this way, the 3D printing system of the present embodiment may also achieve effects the same with that of the aforementioned embodiment.

In summary, the 3D printing system includes the coil-type 3D printing nozzle and the particle-type 3D printing nozzle, so that the printing process of the 3D object may be optimized through the respective advantages of the two different nozzles. Namely, the control module may select to drive the proper printing nozzle according to fineness of the sliced layer of the 3D object or the internal and outer profiles of the 3D object. The particle-type 3D printing nozzle has larger feed-out quantity, so that it is adapted to print the internal structure of the 3D object, so as to effectively reduce a printing time to improve the printing efficiency. Moreover, the coil-type 3D printing nozzle has higher control precision, so that it is adapted to print the outer surface structure of the 3D object, so as to improve fineness and aesthetic effect of the 3D object.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing system, comprising:
   a control module;
   at least one moving module, electrically connected to the control module; and
   a particle-type three-dimensional printing nozzle and a coil-type three-dimensional printing nozzle, disposed on the at least one moving module and respectively and electrically connected to the control module, wherein the control module moves the particle-type three-dimensional printing nozzle or the coil-type three-dimensional printing nozzle through the at least one moving module, and drives the particle-type three-dimensional printing nozzle or the coil-type three-dimensional printing nozzle to perform a three-dimensional printing operation to print a three-dimensional object,
   wherein a forming material feed-out quantity of the particle-type three-dimensional printing nozzle is greater than a feed-out quantity of the coil-type three-dimensional printing nozzle, and a control precision of the coil-type three-dimensional printing nozzle is higher than a control precision of the particle-type three-dimensional printing nozzle,
   wherein the control module decides to drive the particle-type three-dimensional printing nozzle or the coil-type three-dimensional printing nozzle to perform the three-dimensional printing operation according to an internal profile and an outer profile of the three-dimensional object,
   wherein the control module drives the coil-type three-dimensional printing nozzle to perform the three-dimensional printing operation according to an outer profile of the three-dimensional object, or the control module drives the particle-type three-dimensional printing nozzle to perform the three-dimensional printing operation according to an internal profile of the three-dimensional object,
   wherein the particle-type three-dimensional printing nozzle prints the internal structure of the three-dimensional object, and the coil-type three-dimensional printing nozzle prints the outer surface structure of the three-dimensional object.

2. The three-dimensional printing system as claimed in claim 1, wherein the control module decides to drive the particle-type three-dimensional printing nozzle or the coil-type three-dimensional printing nozzle to perform the three-dimensional printing operation according to fineness of a sliced layer of the three-dimensional object, wherein the control module drives the coil-type three-dimensional printing nozzle to perform the three-dimensional printing operation when a high control precision for a sliced layer of the three-dimensional object is required, or the control module drives the particle-type three-dimensional printing nozzle to perform the three-dimensional printing operation when the high control precision for the sliced layer of the three-dimensional object is not required.

3. The three-dimensional printing system as claimed in claim 1, further comprising two moving modules respectively and electrically connected to the control module, wherein the particle-type three-dimensional printing nozzle is disposed on one of the moving modules and the coil-type three-dimensional printing nozzle is disposed on another one of the moving modules.

4. The three-dimensional printing system as claimed in claim 1, wherein the coil-type three-dimensional printing nozzle comprises:

a first nozzle unit, having a first feed-in region and a first feed-out region, wherein a rod-shape forming material is adapted to enter the first nozzle unit through the first feed-in region;

a first driving unit, disposed on the first nozzle unit, and electrically connected to the control module, wherein the first driving unit is adapted to drive the rod-shape forming material to move in the first nozzle unit; and a first heating unit, disposed on the first nozzle unit, and electrically connected to the control module, wherein the first heating unit is adapted to heat the rod-shape forming material in the first nozzle unit, so as to melt the rod-shape forming material and squeeze the rod-shape forming material out of the first nozzle unit through the first feed-out region.

5. The three-dimensional printing system as claimed in claim 4, wherein the coil-type three-dimensional printing nozzle further comprises a first heat dissipation unit disposed on the first nozzle unit, wherein the first heat dissipation unit is electrically connected to the control module, and the first heat dissipation unit is adapted to dissipate heat of at least a part of the first nozzle unit.

6. The three-dimensional printing system as claimed in claim 1, wherein the particle-type three-dimensional printing nozzle comprises a second nozzle unit, having a second feed-in region and a second feed-out region, wherein a particle forming material is adapted to enter the second nozzle unit through the second feed-in region;

a second driving unit, disposed on the second nozzle unit, and electrically connected to the control module, wherein the second driving unit is adapted to drive the particle forming material to move in the second nozzle unit; and a second heating unit, disposed on the second nozzle unit, and electrically connected to the control module, wherein the second heating unit is adapted to heat the particle forming material in the second nozzle unit, so as to melt the particle forming material and squeeze the particle forming material out of the second nozzle unit through the second feed-out region.

7. The three-dimensional printing system as claimed in claim 6, wherein the particle-type three-dimensional printing nozzle further comprises a second heat dissipation unit disposed on the second nozzle unit, wherein the second heat dissipation unit is electrically connected to the control module, and the second heat dissipation unit is adapted to dissipate heat of at least a part of the second nozzle unit.

8. The three-dimensional printing system as claimed in claim 6, wherein the second driving unit is a screw stem movably disposed in the second nozzle unit, a first section of the screw stem is located at the second feed-in region, a third section of the screw stem is located at the second feed-out region, and the second heating unit corresponds to a second section of the screw stem, wherein the second section is connected between the first section and the third section.

* * * * *